(12) United States Patent
Stoecker et al.

(10) Patent No.: US 11,821,173 B2
(45) Date of Patent: Nov. 21, 2023

(54) INVERTER LOCATION AND ORIENTATION WITHIN A MOBILE MACHINE

(71) Applicant: Caterpillar Inc., Peoria, IL (US)

(72) Inventors: Randy D. Stoecker, Chillicothe, IL (US); David A. Gleissner, Metamora, IL (US); Lance M. Cowper, Metamora, IL (US); Kurt D. Smeltzer, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 1081 days.

(21) Appl. No.: 16/582,850

(22) Filed: Sep. 25, 2019

(65) Prior Publication Data
US 2021/0087789 A1  Mar. 25, 2021

(51) Int. Cl.
| | |
|---|---|
| *E02F 5/32* | (2006.01) |
| *E02F 9/20* | (2006.01) |
| *E02F 9/08* | (2006.01) |
| *H02P 27/04* | (2016.01) |
| *B60L 50/50* | (2019.01) |
| B60R 16/023 | (2006.01) |
| B62D 55/075 | (2006.01) |

(52) U.S. Cl.
CPC .......... *E02F 9/2058* (2013.01); *B60L 50/50* (2019.02); *E02F 9/085* (2013.01); *E02F 9/0866* (2013.01); *H02P 27/04* (2013.01); B60R 16/0231 (2013.01); B62D 55/075 (2013.01)

(58) Field of Classification Search
CPC ...... B60K 7/0015; B60K 6/46; B60K 7/0007; B60K 17/356; B60K 17/043; B60K 17/30; B60K 2001/003; B60K 17/046; B60K 2007/0046; B60K 2007/0038; B60K 1/04; B60K 2007/0061; A01D 67/00; A01D 34/44; A01D 69/02; A01D 34/78; A01D 34/66; A01D 34/6806; B60L 2220/46; B60L 2200/40; B60L 50/50; B60W 2300/156; Y02T 10/62; Y02T 10/64; Y02T 10/72; Y02P 60/14; B60Y 2200/223; E02F 9/2058; E02F 9/085; E02F 9/0866; E02F 3/7618; E02F 3/961; E02F 5/32; E02F 9/207; E02F 9/225; H02P 27/04; B60R 16/0231; B62D 55/075; H02M 7/003
See application file for complete search history.

(56) References Cited

U.S. PATENT DOCUMENTS

| | | | | |
|---|---|---|---|---|
| 257,898 | A | * 5/1882 | Smith | ........................ C21C 3/00 432/103 |
| 519,218 | A | * 5/1894 | Allen | ........................ C21C 5/48 266/224 |
| 1,353,684 | A | * 9/1920 | Wagner | .................. B23K 11/06 219/82 |

(Continued)

*Primary Examiner* — Edwin J Toledo-Duran (57) ABSTRACT

A mobile machine includes front and rear ends, a frame, rotatably supported ground engaging mechanisms, and an electrical drive system. The electrical drive system includes a source of electrical energy, an inverter, at least one electric motor operatively coupled to rotate at least one of the ground engaging mechanisms, a plurality of first electric cables electrically coupling the source of electrical energy to the inverter, and a plurality of second electric cables electrically coupling the inverter to the electric motor. The inverter is disposed in the mobile machine in a vertical orientation at the rear end of the machine.

20 Claims, 6 Drawing Sheets

(56) References Cited

U.S. PATENT DOCUMENTS

| | | | | |
|---|---|---|---|---|
| 1,371,994 A * | 3/1921 | Nesbit | | H02M 1/22 336/182 |
| 1,657,495 A * | 1/1928 | Breisch | | H01J 13/42 313/171 |
| 2,922,332 A * | 1/1960 | Lentz | | G05D 3/20 234/65 |
| 3,024,440 A * | 3/1962 | Pence | | G10K 11/006 367/12 |
| 3,119,988 A * | 1/1964 | Barry | | G09G 1/06 360/79 |
| 3,313,159 A * | 4/1967 | Vanderbeck | | G01N 1/125 73/864.31 |
| 3,364,940 A * | 1/1968 | Ginsburgh | | B67D 7/0401 141/227 |
| RE26,364 E * | 3/1968 | Kurzinski | | C21C 5/04 266/158 |
| 3,809,376 A * | 5/1974 | Plazier | | C21C 5/40 266/158 |
| 3,814,402 A * | 6/1974 | Maubon | | C21C 5/40 266/158 |
| 3,822,800 A * | 7/1974 | Leszczynski | | B62B 3/104 280/833 |
| 4,006,707 A * | 2/1977 | Denslow | | B23K 3/0661 118/421 |
| 4,334,296 A * | 6/1982 | Hall, Jr. | | B06B 1/0603 73/652 |
| 4,789,033 A * | 12/1988 | Dohrmann | | G01G 19/08 177/244 |
| 4,815,048 A * | 3/1989 | Boucher | | G10K 11/355 367/173 |
| 4,966,242 A * | 10/1990 | Baillargeon | | B62D 55/0655 280/421 |
| 5,123,495 A * | 6/1992 | Littlejohn | | B66B 9/08 180/907 |
| 5,454,852 A * | 10/1995 | Pirklbauer | | C21C 5/5229 266/225 |
| 6,298,140 B1 * | 10/2001 | Manavopoulos | | H04R 7/045 181/173 |
| 7,246,522 B1 * | 7/2007 | Diaz | | G01N 29/07 73/52 |
| 8,191,342 B2 * | 6/2012 | Ishii | | B60K 7/0015 56/320.1 |
| 9,476,411 B2 | 10/2016 | Gaigler et al. | | |
| 9,540,788 B2 | 1/2017 | Naito | | |
| 9,790,662 B2 | 10/2017 | Ota et al. | | |
| 10,625,609 B2 * | 4/2020 | Kitazawa | | H02P 27/06 |
| 11,146,199 B2 * | 10/2021 | Mao | | H02M 7/53871 |
| 11,271,490 B1 * | 3/2022 | Vinciarelli | | H02M 3/33592 |
| 2008/0068926 A1 * | 3/2008 | Chambers | | G01S 15/96 367/87 |
| 2009/0064403 A1 * | 3/2009 | Wolfe | | G08B 21/082 4/504 |
| 2010/0025134 A1 * | 2/2010 | Hamada | | B60L 58/40 318/400.3 |
| 2010/0077793 A1 * | 4/2010 | Nishii | | F04C 23/008 62/505 |
| 2011/0242944 A1 * | 10/2011 | Goodson | | G10K 11/006 367/173 |
| 2012/0031689 A1 * | 2/2012 | Kanno | | B60K 1/00 180/65.1 |
| 2012/0031690 A1 * | 2/2012 | Kanno | | B60K 6/40 180/65.1 |
| 2012/0055721 A1 * | 3/2012 | Matano | | B60K 1/04 180/65.1 |
| 2013/0028001 A1 * | 1/2013 | Yokota | | H02M 7/003 363/144 |
| 2014/0169042 A1 * | 6/2014 | Eguchi | | H02M 3/3353 363/21.06 |
| 2014/0230844 A1 * | 8/2014 | Phillips | | B08B 3/12 134/1 |
| 2015/0295389 A1 * | 10/2015 | Steeves | | H02B 1/205 361/624 |
| 2015/0329176 A1 * | 11/2015 | Inoue | | H01M 50/249 180/220 |
| 2017/0058485 A1 | 3/2017 | Yoshino et al. | | |
| 2019/0271292 A1 * | 9/2019 | Noyek | | F03B 13/1885 |
| 2020/0254881 A1 * | 8/2020 | Falke | | B61C 3/00 |
| 2021/0300168 A1 * | 9/2021 | Kohara | | B60K 6/28 |
| 2022/0393609 A1 * | 12/2022 | Ji | | H01F 27/292 |

\* cited by examiner

INVERTER LOCATION AND ORIENTATION WITHIN A MOBILE MACHINE

TECHNICAL FIELD

This disclosure relates generally to the electrification of mobile machines and, more particularly, to the use of the efficient use of an inverter in a mobile machine in order to power one or more electric motors.

BACKGROUND

Machines such as dozers, motor graders, wheel loaders, etc., are used to perform a variety of tasks. In order to reduce emissions that may result from engines commonly used to power such machines, electrical drive components may be incorporated to utilize electrical driving power, and, in some arrangements, to harness energy created during operation of the machine. When used in various operations, such machines may incorporate one or more electric motors. Electrical energy may be provided by, for example, one or more batteries or an internal combustion engine with a generator. During operation, a power inverter may be utilized to convert power provided by the power source for utilization by alternating current (AC) electric motor(s) or direct current (DC) electric motor(s).

Inasmuch as high currents and voltages are present, the inclusion of an inverter in mobile machines may present particular challenges, depending upon the requirements of the machine itself. For example, an inverter may generate a considerable amount of heat, requiring external cooling during usage. Further, not all models in a particular machine platform may utilize such electric motors. In order to minimize both production and assembly costs, it may be desirable to maintain as much uniformity as possible across machine platforms, while taking into account serviceability of various components of the machine as well as the particulars of the machine, such as various options for operating equipment that may be included with the machines. These difficulties may be enhanced in machines like dozers that may utilize operating equipment at both the front and rear of the machine, and may be motivated by track arrangements.

U.S. Pat. No. 9,540,788 discloses a hybrid work vehicle including a pair of electric motors. The electric motors and the engine are disposed in an engine compartment, while an inverter and capacitor are disposed in a cooling compartment separated from the engine by a partition wall. In order to cool the inverter, a hybrid cooler is provided between the inverter and the radiator, the cooling system, including the radiator and hybrid cooler being disposed at the rear of the machine.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, there is provided a mobile machine including a front end, a rear end, a frame, a plurality of ground engaging mechanisms rotatably supported relative to the frame, and an electrical drive system. The electrical drive system includes a source of electrical energy, an inverter, at least one electric motor including a first electric motor, a plurality of first electric cables electrically coupling the source of electrical energy to the inverter, and a plurality of second electric cables electrically coupling the inverter to the first electric motor. The first electric motor is operatively coupled to rotate at least one of the ground engaging mechanisms. The inverter is disposed in a vertical orientation at the rear end of the machine.

In another aspect, there is provided a mobile machine including a front end, a rear end, a frame, a first ground engaging mechanism rotatably supported relative to the frame, a second ground engaging mechanism rotatably supported relative to the frame, and an electrical drive system. The electrical drive system includes a generator, an inverter, a first electric motor operatively coupled to rotate the first ground engaging mechanism, a second electric motor operatively coupled to rotate the second ground engaging mechanism, a plurality of first electric cables electrically coupling the generator to the inverter, a plurality of second electric cables electrically coupling the inverter to the first electric motor, and a plurality of third electric cables electrically coupling the inverter to the second electric motor. The inverter is disposed in a vertical orientation at the rear end of the machine.

In still another aspect, there is provided a mobile machine including a front end, a rear end, a frame, first and second ground engaging mechanisms rotatably supported relative to the frame, and an electrical drive system, and a cooling system. The first ground engaging mechanism includes a first track and a first drive sprocket disposed to rotate the first track. The second ground engaging mechanism includes a second track and a second drive sprocket disposed to rotate the second track. The electrical drive system includes an engine, a generator operatively coupled to the engine, an inverter, a first electric motor operatively coupled to rotate the first drive sprocket, a second electric motor operatively coupled to rotate the second drive sprocket, a plurality of first electric cables electrically coupling the generator to the inverter, a plurality of second electric cables electrically coupling the inverter to the first electric motor, the plurality of second electric cables being coupled to the inverter along one vertical side of the inverter, and a plurality of third electric cables electrically coupling the inverter to the second electric motor, the plurality of third electric cables being coupled to the inverter along an opposed vertical side of the inverter. The cooling system includes a source of cooling fluid including a coolant tank, and a plurality of coolant flow lines coupling the source of cooling fluid to the inverter. The inverter is disposed in a vertical orientation at the rear end of the machine, and at least a portion of the inverter is disposed at a lower height in the machine than the coolant tank.

DETAILED DESCRIPTION

Figure 1:
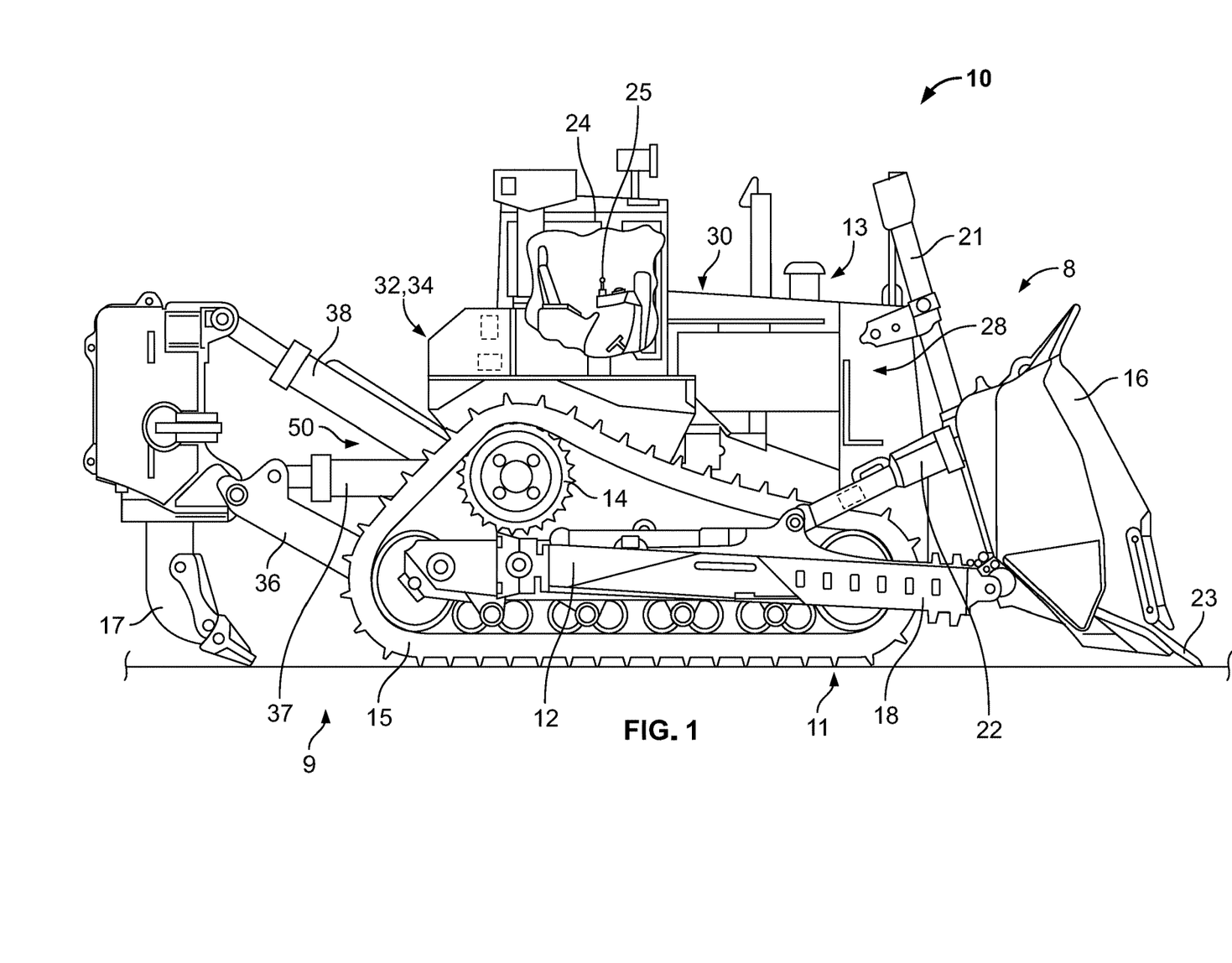
FIG. 1 illustrates a partially broken away, diagrammatic, side elevational view of a representative machine in which an arrangement in accordance with the disclosure is provided.

This disclosure relates to the placement and orientation of an inverter 50 within a mobile machine 10. Turning first to FIG. 1, there is diagrammatically illustrated a side elevational view of a mobile machine 10, such as a dozer, with a ground engaging work implement such as a blade 16 or a ripper 17. The machine 10 generally includes a front end 8 and a rear end 9, and a frame 12. The front end 8 is that end of the machine 10 that is generally disposed forward during operation, while the rear end 9 is that portion that is generally disposed rearward. The rear end 9 may include a rear face 7 that is disposed at the rear end 9 of the machine 10 and frame 12. The blade 16 is disposed at the front end 8 of the machine 10, while the ripper 17 is disposed at the rear end 9. The machine 10 further includes ground-engaging drive mechanisms 11 rotatably supported relative to the frame 12, such as tracks or wheels. In the illustrated embodiment, the ground-engaging drive mechanisms 11 include tracks 15 may be driven by respective drive sprockets 14 on opposite sides of machine 10 to propel the machine 10.

Blade 16 may be pivotably connected to a front portion of the frame 12 by arms 18 on each side of machine 10. First blade hydraulic cylinder 21 coupled to the machine 10 supports blade 16 in the vertical direction and allows blade 16 to move up or down vertically from the point of view of FIG. 1. Second blade hydraulic cylinders 22 coupled to the frame 12 on each side of machine 10 allow the pitch angle of blade tip to change relative to a centerline of the machine.

The ripper 17 may be movably coupled by arms 36 to a portion of the frame 12 disposed at the rear end 9 of the machine 10. First ripper hydraulic cylinders 37 (one being visible in FIG. 1) may be respectively coupled to the frame 12 and a lower portion of the ripper 17 to control the vertical displacement of the ripper 17. Second ripper hydraulic cylinders 38 (one being visible in FIG. 1) may be coupled to the frame 12 and an upper portion of the ripper 17 to control the pitch angle of the ripper 17.

Machine 10 may include a cab 24 (partially broken away) that an operator may physically occupy and provide input to control the machine. Cab 24 may include one or more input devices such as joystick 25 through which the operator may issue commands to control the propulsion system and steering system of the machine 10 as well as operate various implements associated with the machine 10, such as blade 16 and ripper 17.

The machine 10 further includes an electrical drive system 48, which includes a source of electrical energy 28. In the illustrated embodiment, the source of electrical energy 28 includes an engine 13 and a generator 30 (see FIG. 4). Those of skill in the art will appreciate, however, that an alternate source of electrical energy 28 may be provided. For example, the source of electrical energy 28 may alternatively or additionally include one or more batteries.

In order to propel the machine 10, the electrical drive system 48 further includes one or more electric motors 32, 34, which act as prime movers of the machine 10. In the embodiment further discussed in greater detail with regard to FIG. 4, two such electric motors 32, 34 may be provided, for example. Electric motors 32, 34 may be operatively connected to the drive sprockets 14, which drive tracks 15. In an alternate embodiment including wheels (not illustrated), electric motors may be utilized to drive the wheels. It will further be appreciated that one or more additional electric motors may be provided in order to operate other components of the machine 10, such as a ground engaging instrument.

The electric motors 32, 34 may be alternating current or direct current. In order to provide phase of current to the electric motors 32, 34 from the source of electrical energy 28, the electrical drive system 48 further includes an inverter 50. According to an aspect of this disclosure, the inverter 50 is provided at the rear end 9 of the machine 10, the significance of which will become apparent upon the explanation below.

Figure 2:
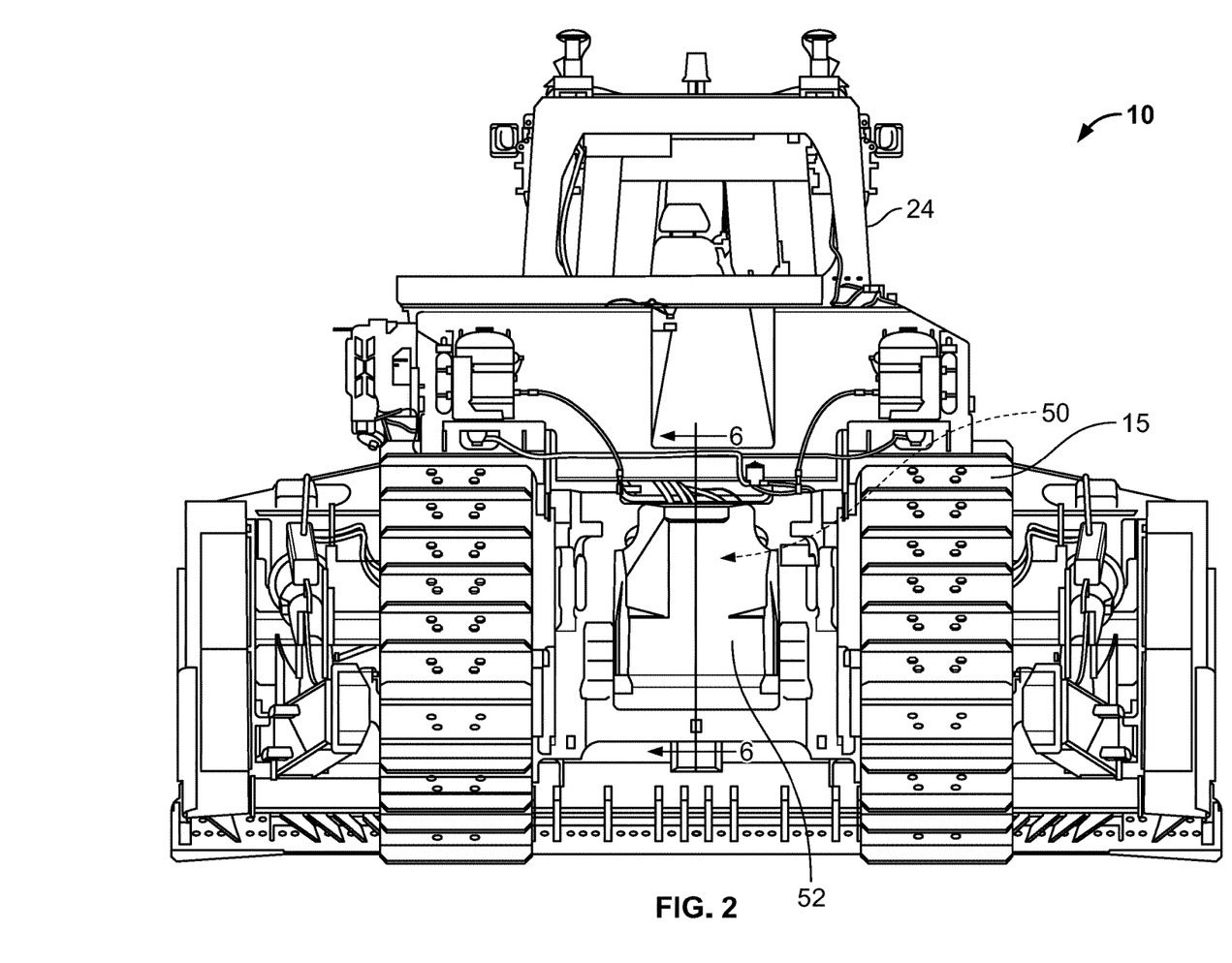
FIG. 2 illustrates a rear elevational view of the machine of FIG. 1.
Figure 3:
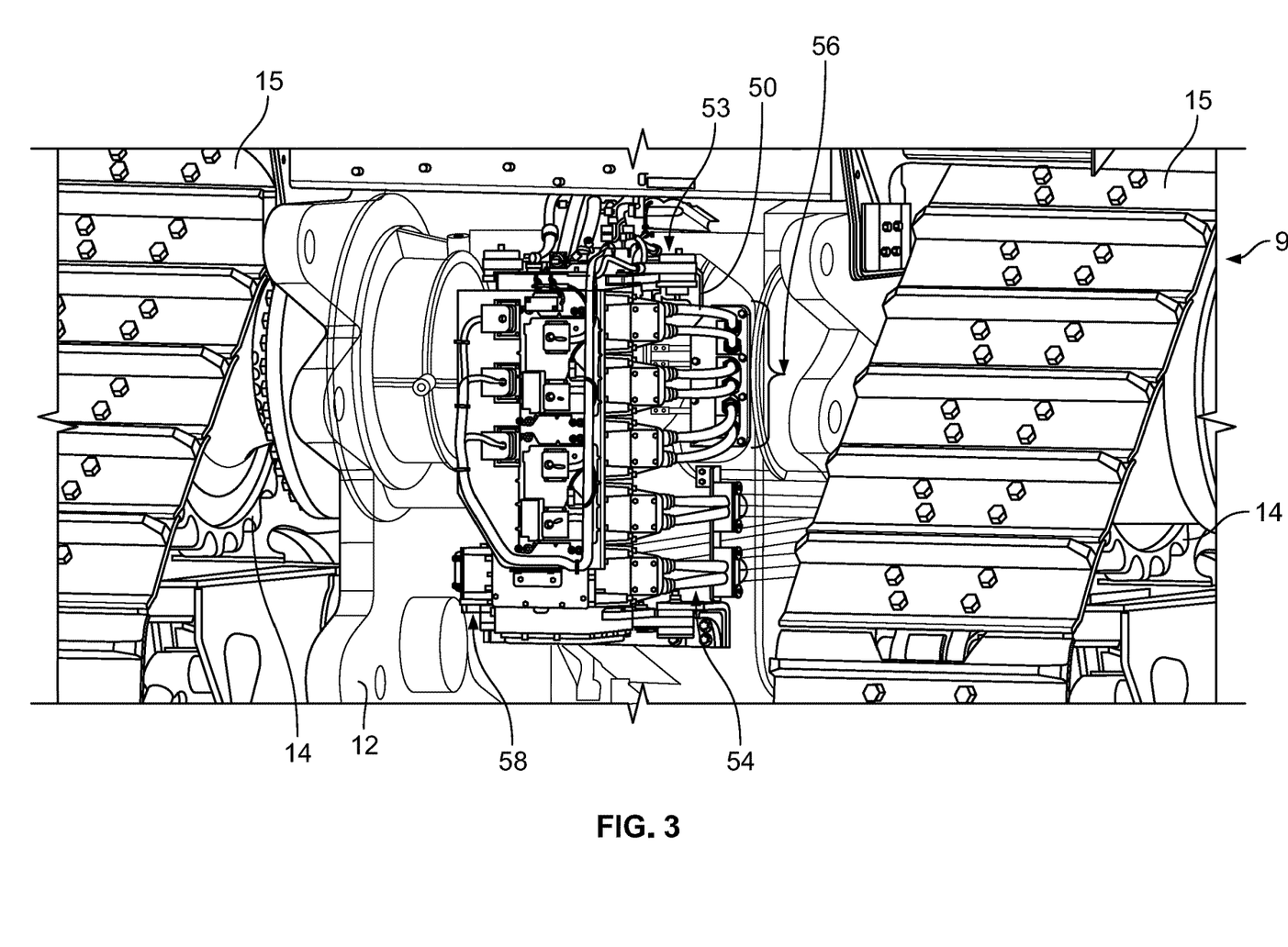
FIG. 3 illustrates a fragmentary isometric view of the a rear end of the machine of FIGS. 1 and 2 wherein a cover over an inverter is removed.

FIG. 2 illustrates a rear elevational view of the machine 10 of FIG. 1 with the ripper 17, the arm 36 and the first and second ripper hydraulic cylinders 37, 38 removed. In order to protect the inverter 50, a removable inverter cover 52 is provided. FIG. 3 illustrates a fragmentary, isometric view of the rear end 9 of the machine 10 with the cover 52 removed to provide access to the inverter 50. The inverter 50 may be of a design that is known in the art, and may include a main body portion 53 to which a plurality of connections are made as will be discussed below.

In accordance with aspects this disclosure, the inverter 50 is disposed in a vertical position at the rear end 9 of the machine 10 in close proximity to the generator 30, as well as the electric motors 32, 34. The disposition of the inverter 50 at the rear end 9 of the machine 10, as well as the removability of the inverter cover 52 may facilitate maintenance related to the inverter 50 by providing direct access to the inverter 50 from a position external to the machine 10.

Figure 4:
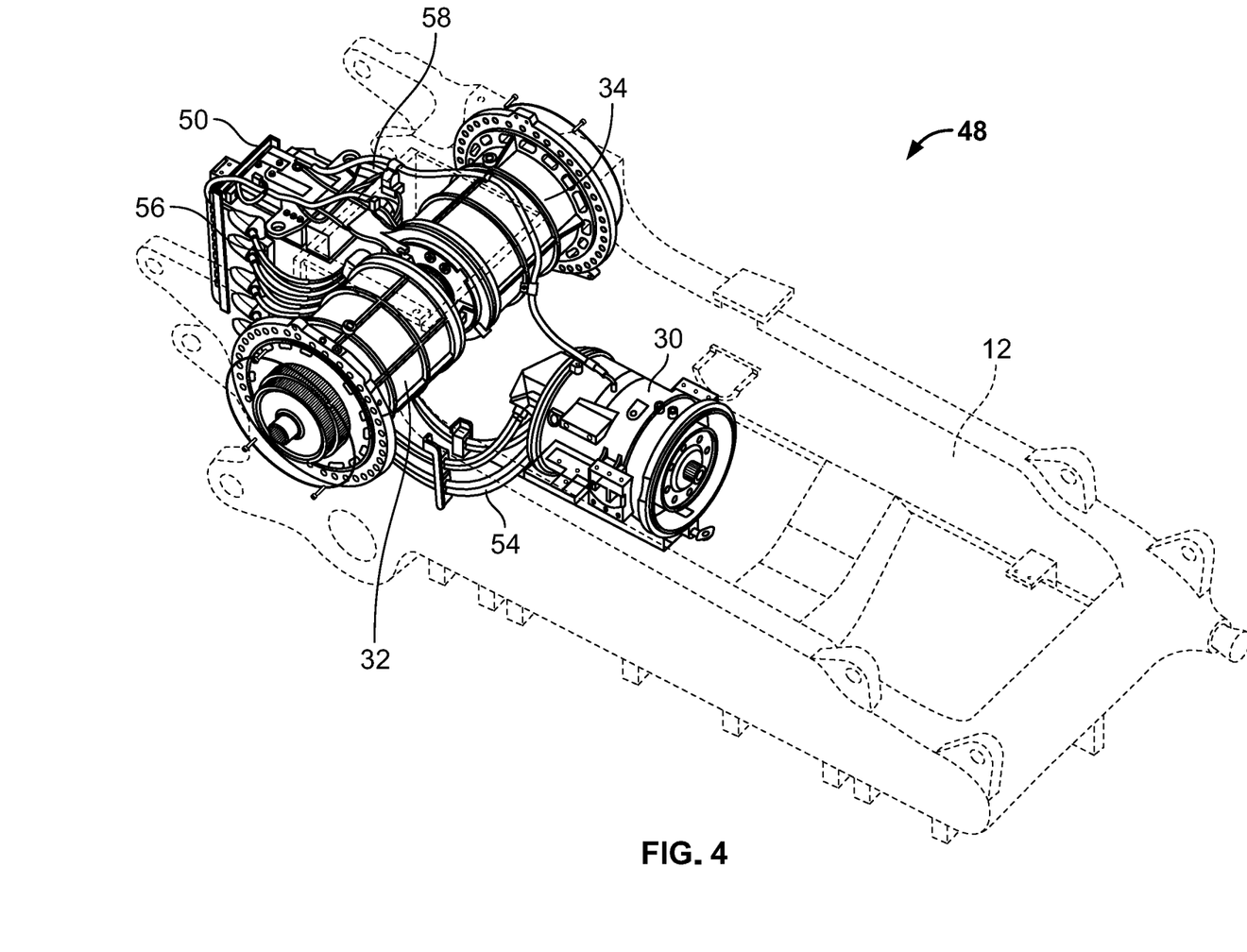
FIG. 4 is a fragmentary, top, side, and front isometric view of an exemplary electric drive system of the machine of FIGS. 1-3, the machine frame being illustrated in phantom.

Referring to FIG. 4, there are illustrated aspects of the electrical drive system 48 of the machine 10 as may be supported by the frame 12. The electrical drive system 48 may include the source of electrical energy 28, the inverter 50, various electric cables 54, 56, 58, and the electric motors 32, 34, which are coupled to the drive sprockets 14. In this embodiment, the source of electrical energy 28 is the engine 13 and the generator 30, the generator 30 being driven by the engine 13, such as an internal combustion engine or the like (see FIG. 1). The generator 30 supplies electrical energy to the inverter 50, which in turn supplies the appropriate driving current to the pair of electric motors 32, 34. In the illustrated embodiment, the pair of electric motors 32, 34 are drivingly coupled to the drive sprockets 14 on either side of the machine 10 to drive tracks 15.

A plurality of electric cables 54, 56, 58 are provided to operatively connect the vertically oriented inverter 50 to the generator 30 and to the electric motors 32, 34. For the purposes of this disclosure, including the claims attached hereto, the term "vertical orientation" denotes a disposition wherein the electric cables 54, 56, 58 are connected to opposite vertical sides of the inverter 50. The term "vertical sides" denotes a disposition generally facing the sides of the machine 10, as opposed to the front end 8 or rear end 9. More specifically, first electric cables 54 may electrically connect the generator 30 to the inverter 50. Second electric cables 56 along one side of the inverter 50 may connect to electric motor 32, while third electric cables 58 along the opposite side of the inverter 50 may connect to electric motor 34. In the illustrated embodiment, the inverter 50 is disposed substantially level with the electric motors 32, 34.

In view of the vertical orientation of the inverter 50, as well as the close proximity of the inverter 50 to the generator 30 and the electric motors 32, 34, relatively short lengths of electric cables 54, 56, 58 may be utilized. Those of skill in the art will appreciate that relatively short cables 54, 56, 58 may provide good current flow, as well as little to no current sloshing.

Figure 5:
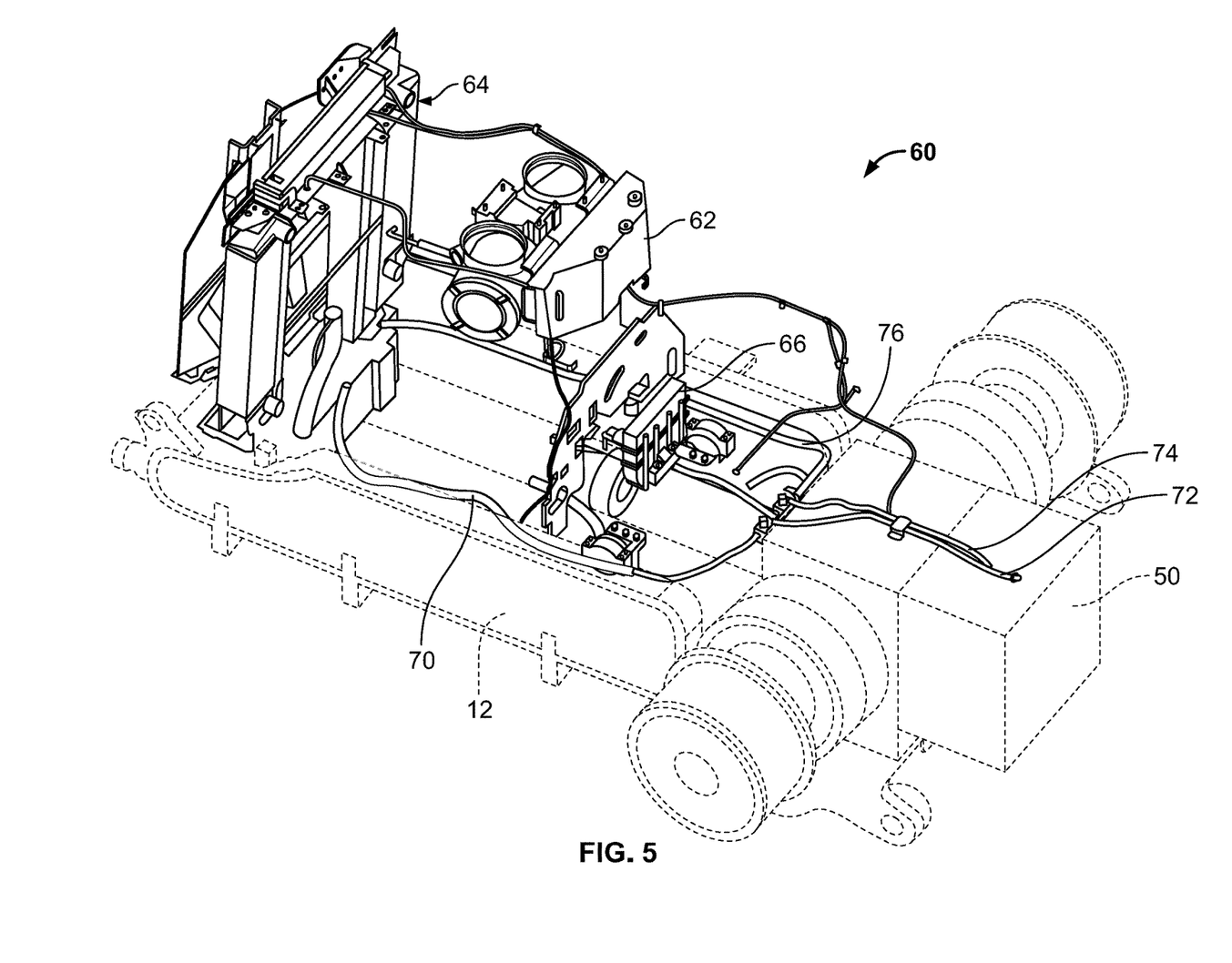
FIG. 5 is a fragmentary, top, side, and rear isometric view of an exemplary cooling system and connection to the inverter of the machine of FIGS. 1-3, the machine frame being illustrated in phantom.

Those of skill in the art will appreciate that the disposal of the inverter 50 at the rear end 9 of the machine 10 may result in enhanced air flow to the inverter 50, which may enhance cooling. In order to further cool the inverter 50, however, a cooling system 60 may be provided. Referring now to FIG. 5, there is illustrated an embodiment of an exemplary cooling system 60 that may be associated with the inverter 50. The cooling system 60 may include a source of cooling fluid and a plurality of coolant flow lines 70, 72, 74, 76. The cooling system 60 may additionally include a thermal control unit 66. The thermal control unit 66 may include, for example, an alternator and compressor for an air conditioning unit. The source of cooling fluid may include a coolant tank 62 and/or a radiator 64. A cooling fluid known in the art, such as ethylene glycol, may be circulated through the cooling system 60. In the illustrated embodiment, a cooling fluid flow may be provided from the radiator 64 and the coolant tank 62 to the inverter 50 through coolant flow lines 70, 72, for example. Fluid heated by the inverter 50 may be returned to the cooling system 60 through coolant flow lines 74, 76.

Figure 6:
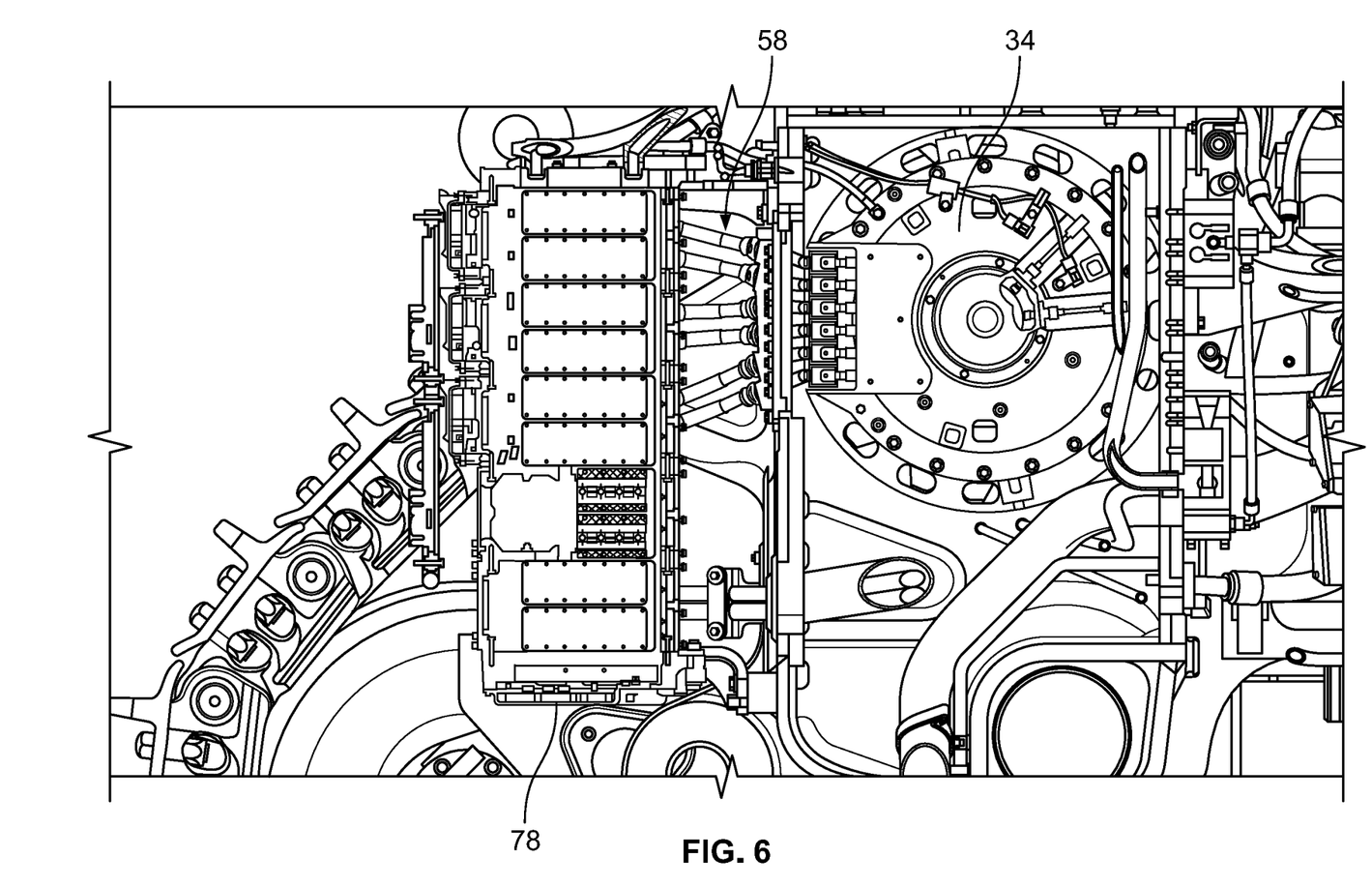
FIG. 6 is fragmentary, cross-sectional view of the inverter taken along line 6-6 in FIG. 2.

In accordance with an aspect of this disclosure, at least a portion of the inverter 50 may be disposed in the machine 10 at a position that is lower than the source of cooling fluid. In view of the generally low disposition of the inverter 50 within the machine 10, a cooling fluid flow to the inverter 50 may be provided or enhanced. In the illustrated embodiment, for example, the inverter 50 is largely disposed at a position lower than the coolant tank 62. That is, the inverter 50 may be disposed entirely or in large part, i.e., substantially physically lower than the coolant tank 62 in the machine 10. This lower disposition allows cooling fluid to flow toward the inverter 50. Turning to the cross-sectional view of FIG. 6, cooling fluid may be readily drained an opening or drain hole in the bottom 78 of the inverter 50 for service.

INDUSTRIAL APPLICABILITY

The utilization of electric motors in mobile machines provides a number of advantages over conventionally motivated machines, such as facilitating finer speed control and finer positioning control. While the use of electric motors may also result in reduced maintenance costs due to the elimination or the reduction in reliance upon complex transmissions or gearing arrangements, the incorporation of components required for utilization of electrical arrangements may result in challenges in routine maintenance or other service.

The disclosed arrangement for placement of an inverter 50 in a machine 10 such as a dozer may facilitate maintenance and service. Placement of the inverter 50 at the rear end 9 of the machine 10 may provide easy access for connection of the inverter 50 to nearby electric motors 32, 34, as well as to the source of electrical energy, such as a generator 30. Connections of the electric cables 54, 56, 58 to either side of the vertically disposed inverter 50 are easily accessible. Components of the inverter 50 may be removed and replaced, or, if necessary, the inverter 50 may be removed as a module for service or replacement.

Further, the disposition of the inverter 50 at a relatively low position may provide for good coolant fluid flow to the inverter 50, possibly enhancing the lifecycle of the invertor 50 or reducing maintenance required. Should removal or maintenance of the inverter 50 be required, cooling fluid may readily be drained from the bottom 78 of the inverter 50.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A mobile machine, comprising:
   a front end;
   a rear end;
   a frame;
   a plurality of ground engaging mechanisms rotatably supported relative to the frame; and
   an electrical drive system including:
      a source of electrical energy,
      an inverter,
      a first electric motor, the first electric motor being operatively coupled to rotate at least one of the plurality of ground engaging mechanisms,
      a plurality of first electric cables electrically coupling the source of electrical energy to the inverter,
      a plurality of second electric cables electrically coupling the inverter to the first electric motor, and
      a plurality of third electric cables,
         wherein the inverter is disposed in a vertical orientation at the rear end,
         wherein one or more of the plurality of second electric cables are coupled to the inverter along a first vertical side of the inverter, and
         wherein one or more of the plurality of third electric cables are coupled to the inverter along a second vertical side of the inverter.

2. The mobile machine of claim 1,
   wherein the electrical drive system further includes a second electric motor, and
   wherein the plurality of third electric cables electrically couple the inverter to the second electric motor.

3. The mobile machine of claim 1,
   wherein the electrical drive system further includes a second electric motor, wherein the plurality of ground engaging mechanisms includes a first track and a second track, wherein the first electric motor is configured to rotate a first drive sprocket that is configured to rotate the first track, and wherein the second electric motor is configured to rotate a second drive sprocket that is configured to rotate the second track.

4. The mobile machine of claim 3, wherein the first drive sprocket and the second drive sprocket are coupled to the frame proximate to the rear end.

5. The mobile machine of claim 1, wherein the plurality of second electric cables are coupled to the inverter along the first vertical side of the inverter, and wherein the plurality of third electric cables are coupled to the inverter along the second vertical side of the inverter.

6. The mobile machine of claim 1, wherein the source of electrical energy includes an engine and a generator.

7. The mobile machine of claim 6, wherein the plurality of first electric cables electrically couple the generator and the inverter.

8. The mobile machine of claim 1, wherein the plurality of first electric cables are coupled to the inverter along one or more of the first vertical side of the inverter or the second vertical side of the inverter.

9. The mobile machine of claim 1, wherein the inverter is disposed substantially adjacent to the first electric motor, the inverter being disposed toward the rear end relative to the first electric motor.

10. The mobile machine of claim 1, further including, a cooling system including a source of cooling fluid and a plurality of coolant flow lines coupling the source of cooling fluid to the inverter, wherein at least a portion of the inverter is disposed at a lower height in the mobile machine than the source of cooling fluid.

11. The mobile machine of claim 1, further including:
a coolant tank,
the inverter being disposed lower than the coolant tank.

12. The mobile machine of claim 1, wherein the inverter includes a drain hole configured to allow cooling fluid to drain from the inverter.

13. The mobile machine of claim 1, further including a removable inverter cover.

14. A mobile machine comprising:
a frame;
a first ground engaging mechanism rotatably supported relative to the frame;
a second ground engaging mechanism rotatably supported relative to the frame; and
an electrical drive system including:
a generator,
an inverter,
a first electric motor operatively coupled to rotate the first ground engaging mechanism,
a second electric motor operatively coupled to rotate the second ground engaging mechanism,
a plurality of first electric cables electrically coupling the generator to the inverter,
a plurality of second electric cables electrically coupling the inverter to extending from the first electric motor towards a rear end, of the mobile machine, where the inverter is disposed, and a plurality of third electric cables extending from the second electric motor towards the rear end, of the mobile machine, where the inverter is disposed, wherein the inverter is disposed in a vertical orientation at the rear end of the mobile machine.

15. The mobile machine of claim 14, wherein the electrical drive system further includes an engine operatively coupled to the generator.

16. The mobile machine of claim 14, wherein the first ground engaging mechanism includes a first track and a first drive sprocket disposed to rotate the first track, wherein the second ground engaging mechanism includes a second track and a second drive sprocket disposed to rotate the second track, wherein the first electric motor is disposed to rotate the first drive sprocket, and wherein the second electric motor is disposed to rotate the second drive sprocket.

17. The mobile machine of claim 14, wherein the plurality of second electric cables are coupled to the inverter along one vertical side of the inverter, and wherein the plurality of third electric cables are coupled to the inverter along an opposed vertical side of the inverter.

18. The mobile machine of claim 14, further comprising:
a source of cooling fluid, and
a plurality of coolant flow lines coupling the source of cooling fluid to the inverter,
wherein at least a portion of the inverter is disposed at a lower height in the mobile machine than the source of cooling fluid.

19. The mobile machine of claim 14, further comprising:
a coolant tank,
the inverter being disposed lower than the coolant tank.

20. A mobile machine, comprising:
a front end;
a rear end;
a frame;
a first ground engaging mechanism rotatably supported relative to the frame, the first ground engaging mechanism including a first track and a first drive sprocket disposed to rotate the first track;
a second ground engaging mechanism rotatably supported relative to the frame, the second ground engaging mechanism including a second track and a second drive sprocket disposed to rotate the second track;
an electrical drive system including:
an engine,
a generator operatively coupled to the engine,
an inverter disposed in a vertical orientation at the rear end,
a first electric motor operatively coupled to rotate the first drive sprocket,
a second electric motor operatively coupled to rotate the second drive sprocket,
a plurality of first electric cables electrically coupling the generator to the inverter,
a plurality of second electric cables electrically coupling the inverter to the first electric motor, the plurality of second electric cables being coupled to the inverter along one vertical side of the inverter, and
a plurality of third electric cables electrically coupling the inverter to the second electric motor, the plurality of third electric cables being coupled to the inverter along an opposed vertical side of the inverter; and
a cooling system including
a source of cooling fluid including a coolant tank, and
a plurality of coolant flow lines coupling the source of cooling fluid to the inverter,
wherein at least a portion of the inverter is disposed at a lower height in the mobile machine than the coolant tank.

* * * * *